(12) United States Patent
Su et al.

(10) Patent No.: US 11,991,594 B2
(45) Date of Patent: May 21, 2024

(54) TERMINAL INTERACTION METHOD AND TERMINAL

(71) Applicant: Huawei Technologies Co., Ltd., Shenzhen (CN)

(72) Inventors: Da Su, Shenzhen (CN); Siju Wu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 318 days.

(21) Appl. No.: 17/626,692

(22) PCT Filed: Jul. 15, 2020

(86) PCT No.: PCT/CN2020/102021
§ 371 (c)(1),
(2) Date: Jan. 12, 2022

(87) PCT Pub. No.: WO2021/022981
PCT Pub. Date: Feb. 11, 2021

(65) Prior Publication Data
US 2022/0322042 A1 Oct. 6, 2022

(30) Foreign Application Priority Data
Aug. 5, 2019 (CN) .......................... 201910717178.0

(51) Int. Cl.
*H04W 24/00* (2009.01)
*G01S 5/08* (2006.01)
(Continued)

(52) U.S. Cl.
CPC ............... *H04W 4/029* (2018.02); *G01S 5/08* (2013.01); *G06F 3/0346* (2013.01); *H04W 76/14* (2018.02); *H04W 76/15* (2018.02)

(58) Field of Classification Search
CPC ..... H04W 76/15; H04W 76/14; H04W 4/029; G01S 5/08; G06F 3/0346
(Continued)

(56) References Cited

U.S. PATENT DOCUMENTS 11,526,368 B2 * 12/2022 Karashchuk ......... G06Q 10/109
11,675,491 B2 * 6/2023 Meyer ..................... G06F 3/167
715/710
(Continued)

FOREIGN PATENT DOCUMENTS

CN 103703495 A 4/2014
CN 104699244 A 6/2015
(Continued)

*Primary Examiner* — Marceau Milord
(74) *Attorney, Agent, or Firm* — Conley Rose, P.C.

(57) ABSTRACT

A terminal interaction method includes establishing, by a first terminal, a connection to at least one second terminal using a BLUETOOTH component, and obtaining location information of the second terminal; when the first terminal points to a direction of a second terminal, identifying, by the first terminal, the second terminal based on the location information and the direction to which the first terminal currently points; and when the first terminal performs a first action, sending, by the first terminal, a first message to the second terminal based on the first action, where the first message indicates the second terminal to perform a first function, and the first function is in a one-to-one correspondence with the first action.

20 Claims, 3 Drawing Sheets

(51) Int. Cl.
*G06F 3/0346* (2013.01)
*H04W 4/029* (2018.01)
*H04W 76/14* (2018.01)
*H04W 76/15* (2018.01)

(58) Field of Classification Search
USPC .................................. 455/456.3, 41.2, 456.1
See application file for complete search history.

(56) References Cited

U.S. PATENT DOCUMENTS

| | | | |
|---|---|---|---|
| 2009/0180451 A1* | 7/2009 | Alpert | H04W 72/1215 |
| | | | 370/338 |
| 2009/0325598 A1* | 12/2009 | Guigne | G01S 5/021 |
| | | | 455/456.1 |
| 2012/0238216 A1* | 9/2012 | Hallowell | H04W 84/18 |
| | | | 455/41.3 |
| 2013/0154811 A1 | 6/2013 | Ferren et al. | |
| 2013/0271363 A1 | 10/2013 | Poznansky et al. | |
| 2013/0283351 A1* | 10/2013 | Palin | G06F 21/6218 |
| | | | 726/4 |
| 2015/0054630 A1 | 2/2015 | Xu et al. | |
| 2015/0168174 A1* | 6/2015 | Abramson | G01C 21/3484 |
| | | | 701/408 |
| 2016/0249164 A1* | 8/2016 | Jovicic | H04W 4/026 |
| 2016/0252967 A1 | 9/2016 | Liang et al. | |
| 2017/0078454 A1* | 3/2017 | Berookhim | H04L 69/02 |
| 2017/0213449 A1 | 7/2017 | Tchedikian | |
| 2018/0115858 A1* | 4/2018 | Raghavendra | H04W 4/026 |
| 2018/0131554 A1* | 5/2018 | Liu | H04L 27/362 |
| 2018/0151060 A1 | 5/2018 | Griffin | |
| 2018/0270617 A1 | 9/2018 | Zhang et al. | |
| 2020/0404454 A1* | 12/2020 | Ahn | G01R 33/07 |

FOREIGN PATENT DOCUMENTS

| | | |
|---|---|---|
| CN | 106356082 A | 1/2017 |
| CN | 106447855 A | 2/2017 |
| CN | 106663366 A | 5/2017 |
| CN | 106713598 A | 5/2017 |
| CN | 106897038 A | 6/2017 |
| CN | 106899740 A | 6/2017 |
| CN | 108073372 A | 5/2018 |
| CN | 108684023 A | 10/2018 |
| CN | 110021300 A | 7/2019 |
| CN | 110557741 A | 12/2019 |
| WO | 2018213415 A1 | 11/2018 |
| WO | 2019147798 A1 | 8/2019 |

* cited by examiner

TERMINAL INTERACTION METHOD AND TERMINAL

CROSS-REFERENCE TO RELATED APPLICATIONS

This is a U.S. National Stage of International Patent Application No. PCT/CN2020/102021 filed on Jul. 15, 2020, which claims priority to Chinese Patent Application No. 201910717178.0 filed on Aug. 5, 2019, both of which are hereby incorporated by reference in their entireties.

TECHNICAL FIELD

This application relates to the field of wireless communications, and specifically, to a terminal interaction method and a terminal.

BACKGROUND

Indoor positioning is always a hot topic. Common indoor positioning solutions include a triangulation method based on wireless signal strength, a fingerprint positioning method, and a nearest neighbor method. The triangulation method is a classical positioning method. In the triangulation method, a distance between signal sources is calculated by using a received signal strength indicator (Received Signal Strength Indication, RSSI) and a signal attenuation model, and a location of a device is triangulated by using distances between the device and a plurality of signal sources. To put it simply, the fingerprint positioning method is as follows: A signal feature (for example, signal strength of Wi-Fi) at each location is measured in advance and stored in a fingerprint database, and during positioning, a current signal feature is matched with a signal feature in the fingerprint database, to determine a location. The nearest neighbor method is a relatively simple positioning method. In the nearest neighbor method, based on a distance between a device and each signal source, a location of a signal source with strongest signal strength is used as a current location of the device. In an existing commonly used indoor communications technology such as a mobile hotspot Wi-Fi, Bluetooth (Bluetooth) (which is before a Bluetooth 5.1 technology), or ZigBee (Zigbee), only signal strength (Received Signal Strength Indication, RSSI) at a sending device and a receiving device can be learned, and relative locations of the devices cannot be directly obtained. Therefore, in a scenario in which a plurality of terminal devices work collaboratively, there is always no convenient location information-based interaction manner.

In this case, how to implement multi-terminal interaction based on precise positioning of terminals becomes a problem that needs to be urgently resolved.

SUMMARY

This application provides a terminal interaction method and a terminal, to resolve a problem of low switching efficiency and low positioning precision caused by manual Bluetooth switching during multi-terminal interaction.

According to a first aspect, a terminal interaction method is provided, and includes: A first terminal establishes a connection to at least one second terminal by using a Bluetooth module, and obtains location information of the second terminal; when the first terminal points to a direction of a second terminal, the first terminal identifies the second terminal based on the location information and the direction to which the first terminal currently points; and when the first terminal performs a first action, the first terminal sends a first message to the second terminal based on the first action, where the first message is used to indicate the second terminal to perform a first function, and the first function is in a one-to-one correspondence with the first action.

It should be understood that the Bluetooth module included in the first terminal has a positioning function. That is, the Bluetooth module may determine a location of another Bluetooth terminal by using, for example, a directional finding algorithm, and when subsequently interacting with the another Bluetooth terminal, identify, based on location information, whether a terminal with which interaction needs to be performed exists in a specific direction. If a terminal with which interaction needs to be performed exists in the specific direction, multi-terminal mid-air gesture interaction may be performed. Each of the first terminal, the second terminal, and the like in this embodiment of this application is a Bluetooth device, that is, includes a Bluetooth module. A Bluetooth module in a terminal that is configured to actively establish a connection to, identify, or remotely control another Bluetooth device may execute a direction finding algorithm in a Bluetooth 5.1 technology to perform precise positioning. A Bluetooth module in a Bluetooth device that is passively connected, identified, or controlled may support the direction finding algorithm in the Bluetooth 5.1 technology, or may not support the direction finding algorithm in the Bluetooth 5.1 technology. This is not limited in this application. For example, when the first terminal identifies and remotely controls the second terminal, the Bluetooth module in the first terminal needs to support the direction finding algorithm in the Bluetooth 5.1 technology, and the second terminal may not support the direction finding algorithm. When the second terminal identities and remotely controls a third terminal, the second terminal needs to support the direction finding algorithm in Bluetooth 5.1, and the third terminal may not support the direction finding algorithm.

According to the terminal interaction method provided in this embodiment of this application, after establishing a connection to the second terminal for the first time by using the Bluetooth module, the first terminal may store the location information of the second terminal, and when the first terminal needs to identify the second terminal again, the first terminal may identify the second terminal by using the direction to which the first terminal points and the location information of the second terminal. According to the terminal interaction method provided in this embodiment of this application, a plurality of terminals may interact based on a precise Bluetooth positioning technology. In this way, no manual Bluetooth switching is required, and therefore terminal interaction efficiency is improved.

With reference to the first aspect, in some implementations of the first aspect, the obtaining location information of the second terminal includes: The Bluetooth module obtains the location information of the at least one second terminal by using an angle of arrival AoA-based direction finding algorithm or an angle of departure AoD-based direction finding algorithm.

According to the terminal interaction method provided in this embodiment of this application, the first terminal may execute the AoA-based direction finding algorithm or the AoD-based direction finding algorithm by using the included Bluetooth module, to implement precise positioning of another Bluetooth device. Location precision of the another Bluetooth device may be less than 1 m, and therefore positioning precision is improved. This helps the first terminal precisely identify a terminal with which interaction needs to be performed.

With reference to the first aspect, in some implementations of the first aspect, that the first terminal sends a first message to the second terminal based on the first action includes: The first terminal senses the first action by using a motion sensor; and the first terminal sends the first message to the second terminal based on the first action.

With reference to the first aspect, in some implementations of the first aspect, the method further includes: The first terminal prestores a mapping relationship between the first action and the first function.

With reference to the first aspect, in some implementations of the first aspect, the motion sensor includes one or more of the following: an acceleration sensor, a gyro sensor, a gravity sensor, a linear acceleration sensor, or a rotation vector sensor.

With reference to the first aspect, in some implementations of the first aspect; the method further includes: When the first action sensed by the first terminal is an action of moving up and down, the first terminal sends the first message to the second terminal. The first message is used to indicate the second terminal to perform a volume change function.

With reference to the first aspect, in some implementations of the first aspect, the method further includes: When the first action sensed by the first terminal is an action of double-tapping a screen, the first terminal sends the first message to the second terminal. The first message is used to indicate the second terminal to perform a screen capture function.

With reference to the first aspect, in some implementations of the first aspect, the method further includes: The first terminal receives screen capture information sent by the second terminal; when the first terminal points to a third terminal, the first terminal identifies the third terminal; and the first terminal sends the screen capture information to the third terminal.

With reference to the first aspect; in some implementations of the first aspect, the method further includes: The first terminal points to a third terminal, and identifies the third terminal; the first terminal sends first indication information to the second terminal, where the first indication information is used to indicate the second terminal to send first information to the third terminal; and the first terminal sends second indication information to the third terminal, where the second indication information is used to indicate the third terminal to receive the first information sent by the second terminal.

With reference to the first aspect, in some implementations of the first aspect, the first terminal includes a smart band, a watch, or a mobile phone, and the second terminal is a sound box or a television.

According to a second aspect, a terminal is provided. The terminal includes: a Bluetooth module, configured to: establish a connection to at least one second terminal, and obtain location information of the second terminal; a processing module, configured to: when the first terminal points to a direction of a second terminal, identify the second terminal based on the location information and the direction to which the first terminal currently points; and a sending module, configured to: when the first terminal performs a first action, send a first message to the second terminal based on the first action, where the first message is used to indicate the second terminal to perform a first function, and the first function is in a one-to-one correspondence with the first action.

It should be understood that the Bluetooth module included in the first terminal has a positioning function. That is, the Bluetooth module may determine a location of another Bluetooth terminal by using, for example, a directional finding algorithm, and when subsequently interacting with the another Bluetooth terminal, identify, based on location information, whether a terminal with which interaction needs to be performed exists in a specific direction. If a terminal with which interaction needs to be performed exists in the specific direction, multi-terminal mid-air gesture interaction may be performed. Each of the first terminal, the second terminal, and the like in this embodiment of this application is a Bluetooth device, that is, includes a Bluetooth module, and the Bluetooth module may execute a direction finding algorithm in Bluetooth 5.1 to perform precise positioning.

According to the terminal interaction method provided in this embodiment of this application, after establishing a connection to the second terminal for the first time by using the Bluetooth module, the first terminal may store the location information of the second terminal, and when the first terminal needs to identify the second terminal again, the first terminal may identify the second terminal by using the direction to which the first terminal points and the location information of the second terminal. According to the terminal interaction method provided in this embodiment of this application, a plurality of terminals may interact based on a precise Bluetooth positioning technology. In this way, no manual Bluetooth switching is required, and therefore terminal interaction efficiency is improved.

With reference to the second aspect, in some implementations of the second aspect, the Bluetooth module determines the location information of the at least one second terminal by using an angle of arrival AoA-based direction finding algorithm or an angle of departure AoD-based direction finding algorithm.

With reference to the second aspect, in some implementations of the second aspect, the terminal further includes: a motion sensor, configured to sense the first action performed by the first terminal; and the sending module is further configured to send the first message to the second terminal based on the first action.

With reference to the second aspect, in some implementations of the second aspect, the processing module is further configured to prestore a mapping relationship between the first action and the first function.

With reference to the second aspect, in some implementations of the second aspect, the motion sensor includes one or more of the following: an acceleration sensor, a gyro sensor, a gravity sensor, a linear acceleration sensor, or a rotation vector sensor.

With reference to the second aspect, in some implementations of the second aspect, the sending module is further configured to: when the first action sensed by the first terminal is an action of moving up and down, send the first message to the second terminal. The first message is used to indicate the second terminal to perform a volume change function.

With reference to the second aspect, in some implementations of the second aspect, the sending module is further configured to: when the first action sensed by the first terminal is an action of double-tapping a screen, send the first message to the second terminal. The first message is used to indicate the second terminal to perform a screen capture function.

With reference to the second aspect, in some implementations of the second aspect, the terminal further includes: a receiving module, configured to receive screen capture information sent by the second terminal; the processing module is further configured to: when the first terminal points to a third terminal, identify the third terminal; and the sending module is further configured to send the screen capture information to the third terminal.

With reference to the second aspect, in some implementations of the second aspect, the processing module is configured to: when the first terminal points to a third terminal, identify the third terminal; the sending module is configured to send first indication information to the second terminal, where the first indication information is used to indicate the second terminal to send first information to the third terminal; and the sending module is further configured to send second indication information to the third terminal, where the second indication information is used to indicate the third terminal to receive the first information sent by the second terminal.

With reference to the second aspect, in some implementations of the second aspect, the first terminal includes a smart band a watch, or a mobile phone, and the second terminal is a sound box or a television.

According to a third aspect, a terminal is provided, and includes at least one processor and a memory. The memory is configured to store computer program instructions. When the computer program instructions are executed on the at least one processor, the terminal is enabled to implement the method in any implementation of the first aspect.

According to a fourth aspect, a computer program storage medium is provided. The computer program includes program instructions, and when the program instructions are directly or indirectly executed, the method in any implementation of the first aspect is implemented.

According to the terminal interaction method and the terminal provided in embodiments of this application, a plurality of devices interact by using a direction finding characteristic in Bluetooth 5.1. In this way, a process of manually switching a Bluetooth connection is omitted, and therefore interaction efficiency is improved. In addition, an interaction mode of working collaboratively by a plurality of terminals is implemented only through mid-air gesture interaction, to implement more convenient terminal interaction.

DESCRIPTION OF EMBODIMENTS

The following describes technical solutions of this application with reference to the accompanying drawings.

Currently used indoor positioning methods have relatively obvious disadvantages: For example, a nearest neighbor method features poor precision. In a fingerprint positioning method, a large amount of data collection work needs to be performed in advance, and a change of indoor layout greatly affects measurement precision. A triangulation method theoretically features the highest precision, but is still limited by an indoor environment, and it is difficult to ensure measurement precision due to large signal interference and a multipath effect. In addition, the method requires a plurality of data sources.

However, a positioning method to be applied to a multi-terminal interaction scenario needs to feature relatively high precision, to implement accurate and efficient terminal interaction.

On Jan. 29, 2019, the Bluetooth Special Interest Group (Bluetooth Special Interest Group, SIG) announced the official launch of a Bluetooth 5.1 technology. The Bluetooth 5.1 technology provides a location finding function, and the new function supports a plurality of methods for determining a signal direction, including an angle of arrival AoA-based direction finding algorithm and an angle of departure AoD-based direction finding algorithm. In a new currently implemented Bluetooth function, a signal direction within an angle of 5 degrees may be detected. To date, Bluetooth tracking and indoor positioning solutions usually provide positioning precision that falls within a range of 3-4 meters. However, a developer can develop, by using a Bluetooth 5.1 technology solution, a product whose location precision is increased to be less than 1 meter, opening a door to an application that cannot be implemented before. The SIG claims that positioning precision in the Bluetooth 5.1 technology may reach a centimeter level. Therefore, to implement precise multi-terminal interaction at a short distance, a positioning function in the Bluetooth 5.1 technology is applied to a multi-terminal interaction method in the embodiments of this application. In addition, it should be understood that the terminal interaction method provided in the embodiments of this application may be further applied to a technology that supports a direction finding algorithm or another high-precision positioning method and that is after the Bluetooth 5.1 technology.

For ease of understanding, the angle of arrival AoA-based direction finding algorithm and the angle of departure AoD-based direction finding algorithm in the Bluetooth 5.1 technology are first briefly described.

1. AoA-Based Direction Finding Algorithm

Figure 1:
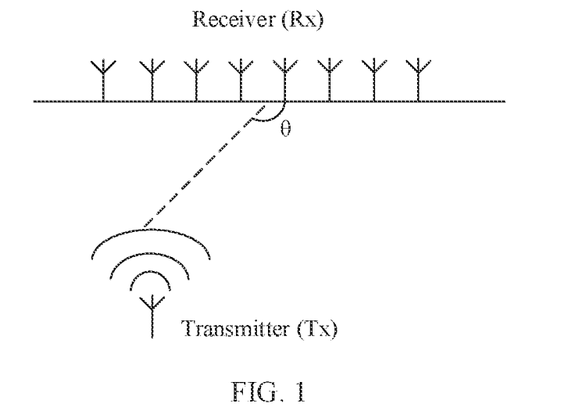
FIG. 1 is a schematic diagram of AoA-based positioning.

FIG. 1 is a schematic diagram of AoA-based positioning.

The AoA-based direction finding algorithm is mainly as follows: When a signal passes through an antenna array of a receiver, the antenna array of the receiver receives the transmit signal at different angles and in different directions. There is a phase difference for a transmit signal received by each antenna, and therefore an incident angle of the transmit signal may be calculated by using the phase difference.

Figure 2:
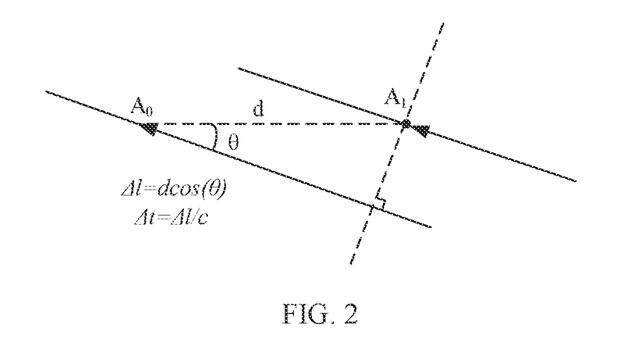
FIG. 2 is a schematic diagram of an application scenario of an AoA-based direction finding algorithm.

In an example, as shown in FIG. 2, it is assumed that there are two antennas (which are denoted as $A_0$ and $A_1$) whose distance from each other is d at a receive end, a received electromagnetic wave is a plane wave, and an angle of arrival is $\theta$. The antenna $A_1$ is used as a reference antenna. Frequency locking is performed on a received signal $e^{j\omega_c t}$ within a reference period (Reference Period) of 8 μs, to generate a local-frequency signal $e^{j\omega_c t}$ coherent to the received signal. A time point at which the signal arrives at the antenna $A_0$ is $\Delta t$ later than a time point at which the signal arrives at the antenna $A_1$, and therefore a signal received by the antenna $A_0$ is $e^{j\omega_c t}$, and after demodulation is performed by using the local-frequency signal, $y=e^{-j\omega_c \Delta t}$. In this case, the angle of arrival is as follows:

$$\theta = \arccos\left(-\frac{c\arg[y]}{d_{\omega c}}\right),$$

where e is a natural logarithm, $\omega_c$ is an angular frequency corresponding to a center frequency, j represents an imaginary number, t represents a time variable, and Δt represents a time difference between the time point at which the signal arrives at the antenna $A_0$ and the time point at which the signal arrives at the antenna $A_1$.

It should be understood that the foregoing description is example description provided for ease of understanding of the AoA-based direction finding algorithm. Actually, to improve estimation precision of the angle of arrival, a plurality of antennas may be configured, and the antenna array may be arranged, for example, in a straight-line shape, a ring shape, or a spherical shape. In this case, a corresponding method for calculating the angle of arrival is more complex. For a method fin calculating the angle of arrival corresponding to an antenna array arranged in a different manner, refer to an existing calculation method. Details are not described herein.

2. AoD-Based Direction Finding Algorithm

Figure 3:
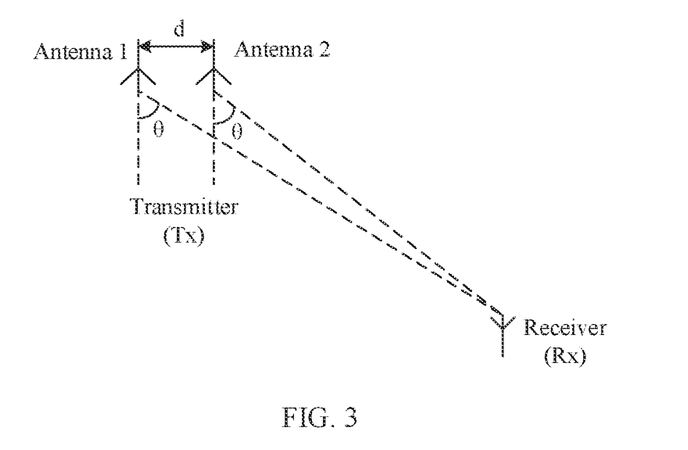
FIG. 3 is a schematic diagram of AoD-based positioning.

FIG. 3 is a schematic diagram of AoD-based positioning.

The AoD-based direction finding algorithm is opposite to the AoA-based direction finding algorithm, and is mainly as follows: A transmitter transmits a signal through a plurality of antennas, and a receiver calculates, by using a phase difference of a received transmit signal, an angle at which the transmit signal is departed from the transmitter.

In an example, it is assumed that the phase difference of the transmit signal is Ψ, a wavelength is λ, a distance between two antennas is d, and a received electromagnetic wave is a plane wave. In this case, the angle of departure may be expressed as follows: $\theta = \arcsin((\psi\lambda)/(2\pi d))$.

The following describes the terminal interaction method provided in the embodiments of this application with reference to the accompanying drawings.

Figure 4:
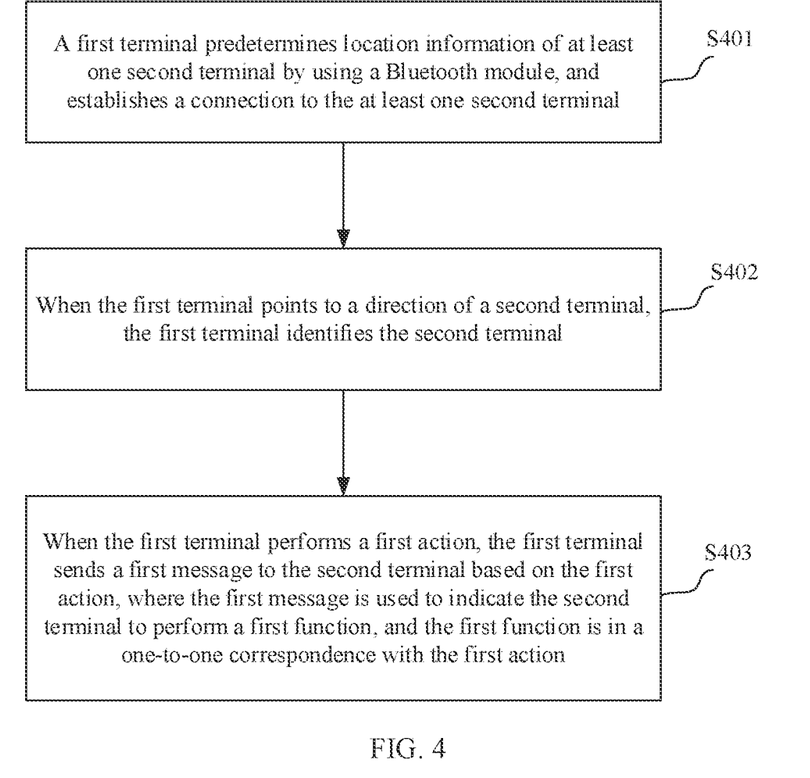
FIG. 4 is a schematic flowchart of a terminal communication method according to an embodiment of this application.

FIG. 4 is a schematic flowchart of a terminal interaction method according to an embodiment of this application.

The terminal interaction method provided in this embodiment of this application is based on a direction finding function in a Bluetooth 5.1 technology. A Bluetooth module establishes a connection to another surrounding Bluetooth device in advance, and obtains location information such as a direction angle characteristic of the another Bluetooth device. When a connection needs to be subsequently established again, the Bluetooth device may automatically identify and establish a connection to a Bluetooth device in a specific direction, and complete a series of mid-air gesture interaction operations at a long distance by using a gesture.

It should be understood that each of a first terminal, a second terminal, and a third terminal in an example of this application is a Bluetooth device, that is, includes a Bluetooth module. A Bluetooth module in a terminal that is configured to actively establish a connection to, identify, or remotely control another Bluetooth device may execute a direction finding algorithm in the Bluetooth 5.1 technology to perform precise positioning. A Bluetooth module in a Bluetooth device that is passively connected, identified, or controlled may support the direction finding algorithm in the Bluetooth 5.1 technology, or may not support the direction finding algorithm in the Bluetooth 5.1 technology. This is not limited in this application. For example, when the first terminal identifies and remotely controls the second terminal, a Bluetooth module in the first terminal needs to support the direction finding algorithm in the Bluetooth 5.1 technology, and the second terminal may not support the direction finding algorithm. When the second terminal identifies and remotely controls the third terminal, the second terminal needs to support the direction finding algorithm in Bluetooth 5.1, and the third terminal may not support the direction finding algorithm. That is, the terminal in this embodiment of this application may perform positioning by using the Bluetooth module, and positioning precision is far higher than that achieved by currently using a terminal in which an infrared transmitter is built. The terminal interaction method provided in this embodiment of this application mainly includes the following steps.

S401. The first terminal predetermines location information of at least one second terminal by using the Bluetooth module, and establishes a connection to the at least one second terminal.

In an implementation, the first terminal is a device in which a Bluetooth module is built. For example, the first terminal may be a wearable device (for example, a wristband or a watch) or a mobile phone in which a Bluetooth module is built. The second terminal is also a device in which a Bluetooth module is built. For example, the second terminal may be a sound generating device (for example, a sound box) or a television in which a Bluetooth module is built.

In an implementation, before interacting with the second terminal, the first terminal may periodically scan a surrounding second terminal by using the Bluetooth module in advance, and establish a connection to (that is, pair with) the surrounding second terminal. In addition, the first terminal and the second terminal may prestore connection information or trust information of each other.

In an implementation, the Bluetooth module in the first terminal obtains the location information such as a direction angle characteristic of the second terminal by using an AoA-based direction finding algorithm or an AoD-based direction finding algorithm, and may determine, for example, a direction of the second terminal based on the location information. The second terminal may be one of a plurality of terminals located in a short-distance range around the first terminal. For example, the first terminal and the second terminal may be two Bluetooth devices located in a same room.

S402. When the first terminal points to a direction of a second terminal, the first terminal identifies the second terminal.

In an implementation, when the first terminal needs to interact with a specific second terminal, the first terminal may stay, for a specific period of time, in a direction that points to the second terminal, and determine, based on positioning information from the Bluetooth module, whether a second terminal with which interaction needs to be performed exists in the direction to which the first terminal currently points. When the first terminal identifies that a second terminal that meets a condition exists in the current direction, the first terminal may activate a mode of remotely controlling the second terminal. The mode of remotely controlling the second terminal by the first terminal may be, for example, as follows: The first terminal sends, to the second terminal, indication information used to indicate the second terminal to perform a specific function, and the second terminal determines, based on the indication information, to perform the specific function. Alternatively, the first terminal performs a specific action to trigger a motion sensor, so as to further trigger the first terminal to send, to the second terminal, indication information used to perform a specific function, so that the second terminal performs a corresponding function. In addition, that the first terminal identifies the second terminal may mean that the first terminal determines, based on the location information of the second terminal that is obtained in advance and the direction to which the first terminal currently points, that the second terminal is a terminal with which the first terminal needs to interact.

It should be understood that positioning precision achieved based on the Bluetooth 5.1 technology may reach a centimeter level. Therefore, in this embodiment of this application, the direction of the second terminal to which the first terminal points may be a direction of a connecting line between the first terminal and the second terminal. Alternatively, if the direction of the connecting line is used as a reference, the direction is a direction that falls within an error range allowed in a Bluetooth positioning technology. That is, the direction to which the first terminal points should fall within a direction range required by the first terminal to determine a location of the second terminal by using the Bluetooth module.

S403. When the first terminal performs a first action, the first terminal sends a first message to the second terminal based on the first action, where the first message is used to indicate the second terminal to perform a first function, and the first function is in a one-to-one correspondence with the first action.

In an implementation, a motion sensor may be disposed on the first terminal. The motion sensor may be, for example, an acceleration sensor, a gyro sensor, a gravity sensor, a linear acceleration sensor, or a rotation vector sensor. The first terminal may sense the first action by using the motion sensor. The first action may be, for example, an action of enabling, by a user, the first terminal to move up and down or an action of double-tapping a screen of the first terminal by a user. For example, when the first terminal is a smart band, the user may enable, by waving a hand up and down, the first terminal to perform the first action of moving up and down. In this case, the first terminal may sense the action by using the disposed acceleration sensor or gyro sensor.

In an implementation, the first terminal stores a one-to-one correspondence between the first action and the first function. The first function is a function that the first terminal expects or requests the second terminal to perform, for example, a volume adjustment function or a screen capture function. For example, a first function corresponding to the first action of moving up and down may be the volume adjustment function. Alternatively, a first function corresponding to the first action of double-tapping a screen may be the screen capture function. When the first terminal senses that the first action is the action of moving up and down, the first terminal determines to request the second terminal to perform the volume adjustment function. In this case, the first terminal may send the first message to the second terminal, to request the second terminal to perform the volume adjustment function. Specifically, when the first action sensed by the first terminal is moving up, a corresponding first function may be turning volume up. When the first action sensed by the first terminal is moving down, a corresponding first function may be turning volume down.

In an implementation, after performing the first function, the second terminal may further send first information to the first terminal. The first information may be, for example, screen capture image information obtained after the second terminal performs screen capture.

Figure 5:
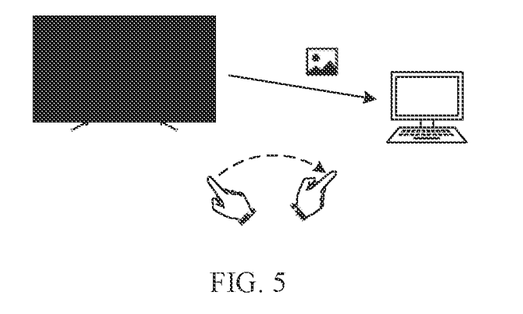
FIG. 5 is a schematic diagram of interaction between Bluetooth terminals according to an embodiment of this application.

In an implementation, the first terminal may point to and identify a terminal for a second time. That is, the first terminal may point to a third terminal, and identify and establish a connection to the third terminal in a manner similar to that of identifying the second terminal. For example, after receiving the first information sent by the second terminal, the first terminal may send the first information to the third terminal. For example, the third terminal may be a display device, configured to display a screen capture image of the second terminal. Alternatively, the third terminal may be an audio play device such as a Bluetooth sound box, configured to play audio. For example, as shown in FIG. 5, after the first terminal identifies and establishes a connection to the third terminal, the second terminal may directly send the first information to the third terminal. Specifically, the second terminal and the third terminal may be in a state of being connected by using Bluetooth. After the first terminal identifies and establishes a connection to each of the second terminal and the third terminal, the first terminal may send first indication information to the second terminal, to indicate the second terminal to send the first information to the third terminal. In addition, the first terminal may further send second indication information to the third terminal, to indicate the third terminal to receive the first information sent by the second terminal. The first information may be, for example, screen capture information, video information, or picture information. This is not limited in this application. It should be understood that in this case, a Bluetooth-based interact of things (Internet of Things, IoT) may be formed between terminals, and the first terminal controls interaction between other IoT terminals by performing a direction pointing action. For example, the first terminal projects television audio to a Bluetooth sound box or transfers an access control video to a television screen.

According to the terminal interaction method provided in this embodiment of this application, a plurality of devices interact by using a direction finding characteristic in the Bluetooth 5.1 technology. In this way, a process of manually switching a Bluetooth connection is omitted, and therefore interaction efficiency is improved. In addition, an interaction mode of working collaboratively by a plurality of terminals is implemented only through mid-air gesture interaction, to implement more convenient terminal interaction.

Figure 6:
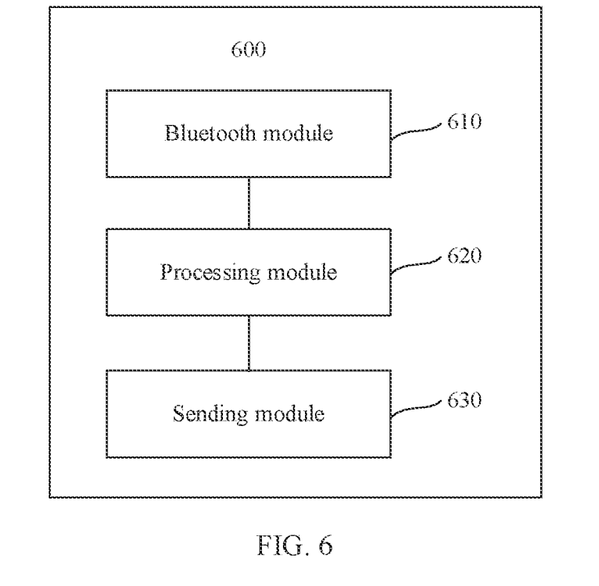
FIG. 6 is a schematic diagram of a structure of a terminal device according to an embodiment of this application.

FIG. 6 is a schematic diagram of a structure of a terminal according to an embodiment of this application. The terminal 600 includes a Bluetooth module 610, a processing module 620, and a sending module 630.

The Bluetooth module 610 is configured to: establish a connection to at least one second terminal, and obtain location information of the second terminal.

The processing module 620 is configured to: when the first terminal points to a direction of a second terminal, identity the second terminal based on the location information and the direction to which the first terminal currently points.

The sending module 630 is configured to: when the first terminal performs a first action, send a first message to the second terminal based on the first action. The first message is used to indicate the second terminal to perform a first function, and the first function is in a one-to-one correspondence with the first action.

The Bluetooth module 610 may be further configured to determine the location information of the at least one second terminal by using an angle of arrival AoA-based direction finding algorithm or an angle of departure AoD-based direction finding algorithm.

In addition, the terminal 600 may further include a motion sensing unit, and the motion sensing unit is configured to sense the first action performed by the first terminal. The motion sensing unit may include an acceleration sensor, a gyro sensor, a gravity sensor, a linear acceleration sensor, a rotation vector sensor, or the like.

The sending module 630 may be further configured to send the first message to the second terminal based on the first action.

The processing module 620 may be further configured to prestore a mapping relationship between the first action and the first function.

The sending module 630 may be further configured to: when the first action sensed by the first terminal is an action of double-tapping a screen, send the first message to the second terminal. The first message is used to indicate the second terminal to perform a screen capture function.

The terminal 600 may further include a receiving unit, and the receiving unit may be configured to receive screen capture information sent by the second terminal.

The processing module 620 may be further configured to: when the first terminal points to a third terminal, identify the third terminal, and send the screen capture information to the third terminal by using the sending module 630.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each specific application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, may be located in one location, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of this application. The foregoing storage medium includes various media that can store program code, such as a USB flash drive, a removable hard disk, a read-only memory (Read-Only Memory; ROM), a random access memory (Random Access Memory, RAM), a magnetic disk, and an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method implemented by a first terminal, wherein the method comprises:
    establishing a first connection to a second terminal and a third terminal using a BLUETOOTH component;
    obtaining first location information of the second terminal and second location information of the third terminal;
    detecting a first pointing to the second terminal;
    making a first identification, in response to the first pointing and based on the first location information, of the second terminal;
    detecting a second pointing to the third terminal;
    making a second identification, in response to the second pointing and based on the second location information, of the third terminal;
    sending, in response to the first identification and to the second terminal, first indication information instructing the second terminal to send first information to the third terminal; and
    sending, in response to the second identification and to the third terminal, second indication information instructing the third terminal to receive the first information from the second terminal.

2. The method of claim 1, further comprising obtaining, using the BLUETOOTH component and using an angle of arrival (AoA)-based direction finding algorithm, the first location information and the second location information.

3. The method of claim 1, further comprising obtaining, using the BLUETOOTH component and using an angle of departure (AoD)-based direction finding algorithm, the first location information and the second location information.

4. The method of claim 1, further comprising:
    establishing a second connection to a fourth terminal using the BLUETOOTH component;
    obtaining third location information of the fourth terminal;
    detecting a third pointing to the fourth terminal;
    making a third identification, in response to the third pointing and based on the third location information, of the fourth terminal; and
    sending, to the fourth terminal and based on a first action and the third identification, a first message instructing the fourth terminal to perform a first function.

5. The method of claim 4, further comprising sensing the first action using a motion sensor.

6. The method of claim 5, further comprising prestoring a mapping relationship between the first action and the first function.

7. The method of claim 5, wherein the motion sensor comprises one or more of:
an acceleration sensor;
a gyro sensor;
a gravity sensor;
a linear acceleration sensor; or
a rotation vector sensor.

8. The method of claim 4, wherein the first action is of moving up and down, and wherein the method further comprises sending, to the fourth terminal, the first message instructing the fourth terminal to perform a volume change function.

9. The method of claim 4, wherein the first action is of double-tapping a screen, and wherein the method further comprises sending, to the fourth terminal, the first message instructing the fourth terminal to perform a screen capture function.

10. The method of claim 1, wherein the first terminal comprises a smart band, a watch, or a mobile phone, and wherein the second terminal is a sound box or a television.

11. A first terminal comprising:
a memory configured to store instructions; and
a processor coupled to the memory, wherein the instructions cause the processor to be configured to:
establish a first connection to a second terminal and a third terminal using a BLUETOOTH component;
obtain first location information of the second terminal and second location information of the third terminal;
detect a first pointing to the second terminal;
make a first identification, in response to the first pointing and based on the first location information, of the second terminal;
detect a second pointing to the third terminal;
make a second identification, in response to the second pointing and based on the second location information, of the third terminal;
send, in response to the first identification and to the second terminal, first indication information instructing the second terminal to send first information to the third terminal; and
send, in response to the second identification and to the third terminal, second indication information instructing the third terminal to receive the first information from the second terminal.

12. The first terminal of claim 11, wherein the instructions further cause the processor to be configured to obtain, using the BLUETOOTH component and using an angle of arrival (AoA)-based direction finding algorithm, the first location information and the second location information.

13. The first terminal of claim 11, wherein the instructions further cause the processor to be configured to obtain, using the BLUETOOTH component and using an angle of departure (AoD)-based direction finding algorithm, the first location information and the second location information.

14. The first terminal of claim 11, wherein the instructions further cause the processor to be configured to:
establish a second connection to a fourth terminal using the BLUETOOTH component;
obtain third location information of the fourth terminal;
detect a third pointing to the fourth terminal;
make a third identification, in response to the third pointing and based on the third location information, of the fourth terminal on; and
send, to the fourth terminal and based on a first action and the third identification, a first message instructing the fourth terminal to perform a first function.

15. The first terminal of claim 14, wherein the instructions further cause the processor to be configured to sense, the first action using a motion sensor.

16. The first terminal of claim 15, wherein the motion sensor comprises one or more of:
an acceleration sensor;
a gyro sensor;
a gravity sensor;
a linear acceleration sensor; or
a rotation vector sensor.

17. The first terminal of claim 15, wherein the first action is of moving up and down, and wherein the instructions further cause the processor to be configured to send, to the fourth terminal, the first message instructing the fourth terminal to perform a volume change function.

18. The first terminal of claim 15, wherein the first action is of double-tapping a screen, and wherein the instructions further cause the processor to be configured to send, to the fourth terminal, the first message instructing the fourth terminal to perform a screen capture function.

19. The first terminal of claim 14, wherein the instructions further cause the processor to be configured to prestore a mapping relationship between the first action and the first function.

20. The first terminal of claim 11, wherein the first terminal comprises a smart band, a watch, or a mobile phone, and wherein the second terminal is a sound box or a television.

* * * * *